Figure 1:
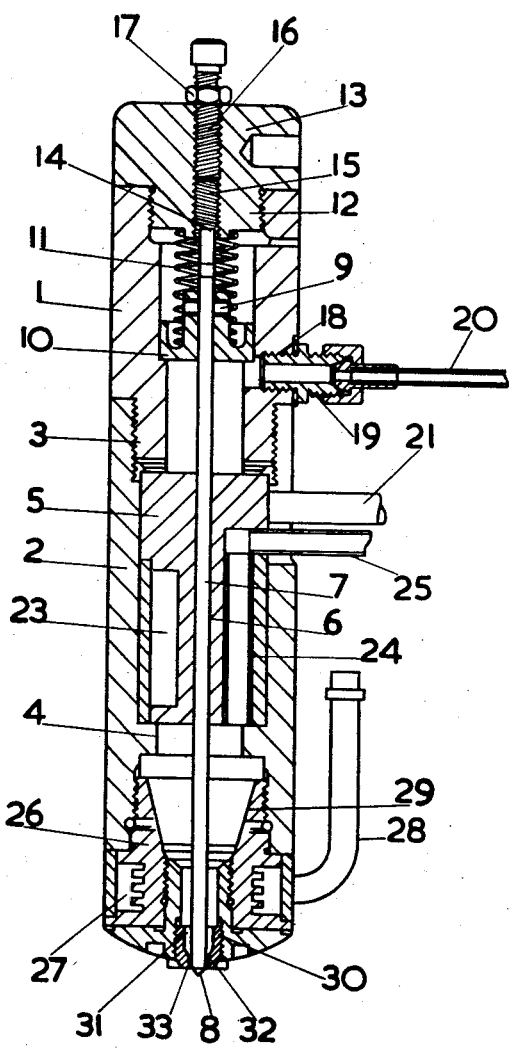

Feb. 2, 1960

K. J. CLEWS ET AL 2,923,809

ARC CUTTING OF METALS

Filed March 24, 1958

2 Sheets-Sheet 1

INVENTORS:
Kenneth James Clews,
Godfrey Brian Roberts,
BY Cushman, Darby & Cushman
ATTORNEYS.

INVENTORS:
Kenneth James Clews,
Godfrey Brian Roberts,
BY Cushman, Darby & Cushman
ATTORNEYS.

United States Patent Office 2,923,809
Patented Feb. 2, 1960

2,923,809
ARC CUTTING OF METALS

Kenneth James Clews, Walsall, and Godfrey Brian Roberts, Brewood, England, assignors to Marston Excelsior Limited, London, England, a corporation of Great Britain Application March 24, 1958, Serial No. 723,486

Claims priority, application Great Britain March 27, 1957

17 Claims. (Cl. 219—69)

This invention relates to apparatus suitable for the production of an electric arc between an electrode and a metal workpiece such apparatus being hereinafter termed for convenience an "arc torch" and is particularly but not exclusively concerned with arc torches for use in the cutting of metals by means of an electric arc.

It is known that ferrous and non-ferrous metals can be cut by means of a constricted high current density gas-shielded arc struck between a nonconsumable electrode and the metal to be cut, for example, a tungsten arc running in an argon/hydrogen mixture. The apparatus employed comprises a torch having a fixed water-cooled electrode located within a surrounding sleeve through which the stream of shielding gas is led terminating in a nozzle having a constricted orifice through which the arc passes. Current for the arc is supplied from a suitable power source, for example, a D.C. generator. In operation, when a cut is to be started, it has hitherto been the practice to utilise a pilot arc to initiate the cutting arc. The nozzle is connected to the positive side of the generator circuit through a resistor to limit the current, whereby a pilot arc can be struck between the electrode and the nozzle. This has the effect of ionising the gas in the vicinity of the nozzle orifice and on approaching the nozzle to the work the arc strikes between the electrode and the work. The use of a pilot arc in this way has, however, the two-fold disadvantage that the pilot arc damages the nozzle and that since the nozzle is maintained at a positive potential the cutting arc frequently strikes from the electrode to the nozzle. When the cutting arc strikes from electrode to nozzle to workpiece, the significant arc length is the distance between the nozzle and the workpiece; this means that the effective arc voltage is considerably lower than that required for cutting and cutting will temporarily cease. Moreover, the striking of the cutting arc from electrode to nozzle damages the latter.

It is the object of this invention to provide an arc cutting apparatus in which the use of a pilot arc striking between the electrode and nozzle is avoided and in which the risk of the cutting arc striking to the nozzle is substantially reduced from that obtained in the above-mentioned apparatus.

According to the present invention an arc torch comprises an electrode, preferably a non-consumable electrode, a nozzle having a passage which is coaxial with the electrode and through which the electrode can extend whereby a pilot discharge can be established between the electrode and a metal workpiece without harming the nozzle, means for effecting relative movement between the electrode and nozzle whereby the electrode can be so positioned in relation to the nozzle that a main arc struck between the electrode and workpiece passes through said passage, said passage being sufficiently constricted to wall stabilise a portion of the length of said main arc, and means permitting a gaseous stream to be directed through said passage towards the workpiece and so as to shield the electrode during use.

The invention also includes a process of treating a metal workpiece with a high current density arc which passes from an electrode to the workpiece by way of a passage coaxial with the electrode and provided in a nozzle said passage being sufficiently constricted to wall stabilise the arc, which process comprises positioning the electrode whereby a pilot discharge can be established between the electrode and workpiece without harming the nozzle, establishing said discharge and then establishing the arc and thereafter positioning the electrode in relation to the nozzle whereby the arc is wall stabilised, said process being conducted in the presence of a protective gas for the electrode and workpiece which is caused to follow the path of the arc.

The term "pilot discharge" is used in this specification to mean a discharge which has the effect of suitably ionising the gaseous medium between the electrode and workpiece to permit the striking of the main arc. The pilot discharge is preferably produced by means of a high frequency spark oscillator coupled to an electric circuit containing the electrode and workpiece. Alternatively a surge injector or a touch-start arrangement may be employed, in the latter case a voltage sensitive relay being provided which acts to retract the electrode as soon as the electrode touches the workpiece. In the case of a touch-start arrangement it will be appreciated that the pilot discharge is constituted by the opening stages of the main arc itself.

The present invention therefore departs from existing practice in that the pilot discharge is struck between the electrode and the workpiece rather than between the electrode and the nozzle and the nozzle is insulated from the electric circuit including the source for producing both pilot and main discharge. With this arrangement it is found necessary that the nozzle be positioned further from the workpiece than the electrode tip during the establishment of the pilot discharge. The reason for this is that the nozzle becomes electrostatically charged during the discharge and if the nozzle is as near to the workpiece as the electrode tip the discharge is able to pass from the electrode to the nozzle to the workpiece with devastating effects on the nozzle. If the nozzle is nearer to the workpiece than is the electrode tip the discharge will pass preferentially from electrode to nozzle to workpiece. Once the main arc is established the nozzle assumes only a floating potential during the maintenance thereof and this reduces the tendency of the arc to pass from the electrode to the nozzle.

The positioning of the electrode relative to the nozzle may be effected by movement of either member with respect to the other. Thus the electrode may be retractable relatively to a stationary nozzle between a position for initiating the pilot discharge between the electrode and workpiece and a position relative to the nozzle for the establishment of the wall stabilised arc, i.e. the working position. Alternatively the electrode may be fixed in such a position in the torch to permit the workpiece to be brought to a convenient working distance from it, the nozzle being mounted for movement into and out of its position for wall stabilising the arc.

In preferred constructions the nozzle will be a stationary member and the electrode will be mounted for movement with respect thereto, e.g. by sliding movement, the electrode being biased so that its tip normally protrudes beyond the forward end of the passage in the nozzle and the means for moving the electrode being operable, for example manually or electrically, to retract the electrode to its working position in relation to the nozzle.

Instead of a manual or electrical arrangement for retracting the electrode, the upper portion of the latter may be formed as or connected to a piston slidable in a cylinder and actuated pneumatically to retract the electrode, e.g. by means of a tapping from the shielding gas supply to the torch. The flow of gas to the piston is preferably established automatically as the cutting arc strikes.

As a further alternative the electrode may be biased, e.g. by a spring, so that its tip is normally located inside the nozzle and independent gas pressure may be utilised to move the electrode into the arc-initiating position against the spring.

It is also an advantageous feature to provide in the torch a stop member for locating the electrode in its correct working position the stop member being adjustable by means external to the torch whereby the working position of the electrode may be adjusted without the need for dismantling the apparatus.

As indicated, use is made according to this invention of a nozzle in which the passage is sufficiently constricted to wall stabilise the main arc and for any set of operating conditions there is a maximum cross-sectional dimension of the passage above which the wall stabilising effect is not achieved. The appropriate size of the passage can however be determined by comparatively simple experiment. By further constricting the passage beyond that required for wall stabilisation, the main arc itself becomes laterally more constricted and the result of this is that the arc voltage is increased. The combination of wall stabilisation and lateral constriction of the arc can be made use of for the production of welding and cutting arcs and the invention includes arc torches which are especially designed for welding or cutting metals.

It has also been found that the risk of the arc striking from the electrode to the nozzle can be still further reduced by using an electrode in the form of a pencil of which the tip is formed with a flat portion. In general, the flat has an optimum size which varies with the maximum diameter of the electrode which is in turn chosen in accordance with the operating current required, and for a thoriated tungsten electrode having a maximum diameter of 1/8" and a 30° apex angle of tip a circular flat of 0.025" has been found suitable. For larger diameter electrodes the optimum size of flat will be larger and may for example be up to 3/64" in diameter. The production of a flat on the electrode tip has the advantage of preventing the cathode spot from wandering up towards the shank of the electrode. Since the electrode tip is of tapered form, if the cathode were allowed to move up towards the shank it would increasingly approach the nozzle and the risk of the arc striking from the electrode to the nozzle by accident would be greater.

The shielding gas used according to the invention may be, for example, a mixture of argon and hydrogen.

Figures 2, 3:
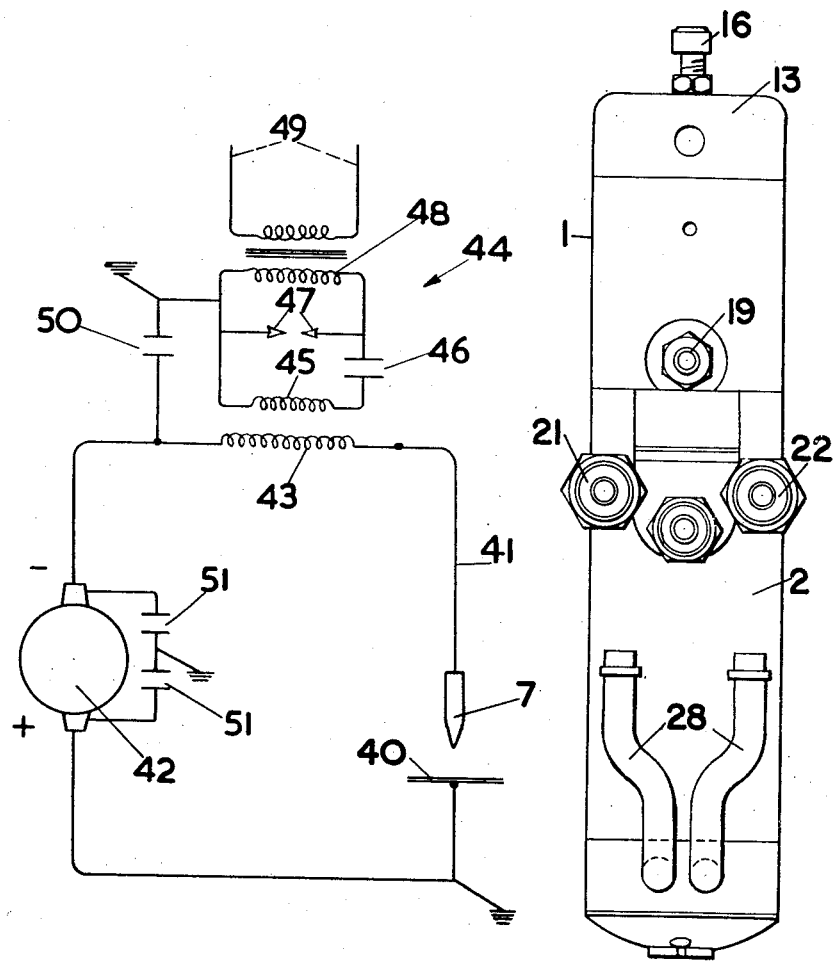

The invention is illustrated by way of example in the accompanying drawings of which:

Figure 1 is a vertical section of an arc cutting torch.
Figure 2 is a side view of the torch of Figure 1.
Figure 3 is a schematic circuit diagram for use with the torch of Figure 1.

Referring now to Figures 1 and 2, the torch comprises tubular upper and lower body parts 1, 2 the upper body part 1 having a threaded spigot 3 engaging in a correspondingly threaded upper end portion of the lower body part 2. The lower part 2 has an internal ledge 4 upon which is supported a hollow block 5, held in position by means of the end of the spigot 3. The block 5 has a central vertical bore 6 in which is slidably mounted a thoriated tungsten electrode 7 in the form of a pencil which in the position illustrated is in its starting position with its tip 8 about 1/16 of an inch below the bottom of the torch. The tip 8 of the electrode is provided with a flat but this cannot be seen on the scale to which Figure 1 has been drawn. The electrode 7 is connected by means of grub screws 9 to the piston 10 slidably mounted in the upper body part 1 for movement from the position shown, in which it rests on a shoulder formed internally on the part 1, to a higher position against the action of a compression spring 11. The spring 11 abuts at its upper end against a spigot portion 12 of a cap 13 threadedly engaging with the upper end portion of the part 1. As shown, the electrode 7 is formed at its upper end with a head 14 which is slidably located in a central bore 15 in the cap 13 and extending with this bore 15 from the outside is a cap screw 16 positioned by means of a locknut 17. The cap screw 16 acts as a stop member to determine the uppermost position of the electrode 7 and is adjustable axially of the bore manually by turning the head of the screw.

Communicating with the space between the block 5 and piston 10 is an inlet hole into which is fitted a standard form of pipe union 19 for admitting gas into the torch from a pipe 20 so as to act on the piston 10 to raise it against the spring 11.

Communicating with the interior of the block 5 are inlet and outlet pipes 21, 22 for the admission of cooling liquid to the block 5 which passes from pipe 21 to pipe 22 by way of a chamber 23. An electrical lead wire (not shown) passes into one of the pipes 21, 22 and is connected to the block 5, the block 5 serving to conduct current to the electrode 7.

The block also has fitted into it a gas supply pipe 24 which extends parallel to the electrode 7 and communicates with the space below the block 5. Gas is admitted to the pipe 24 by an inlet pipe 25. The pipes 21, 22 25 extend outwardly through an opening in the lower body part 2 of the torch.

Threadedly secured to the bottom end portion of the part 2 and surrounding the electrode 7 is a nozzle holder mounting 26 which has an interior cooling chamber 27 having a finned inner wall and provided with inlet and outlet pipes 28 for liquid coolant. The inner surface of the mounting 26 is tapered at 29 for guiding gas to the electrode 7 as hereinafter described and the tapered part 29 leads downwardly to a cylindrical threaded bore in the mounting into which is secured a nozzle holder 30. The lower end of the nozzle holder 30 is enlarged and engages against the lower face of the mounting 26 when screwed into position. The nozzle holder 30 itself has a central bore 31 into which is threadedly secured a nozzle 32, the nozzle 32, nozzle holder 30 and mounting 26 being thus coaxial with the electrode 7, which is thereby capable of movement axially of the central passage 33 defined by the nozzle 32. The passage 33 in the nozzle 32 while being large enough to permit the electrode 7 and a sufficiently thick layer of shielding gas to pass through it is yet sufficiently constricted to wall stabilise an arc which is constrained to pass through it.

The cap 13, and body parts 1, 2 of the torch are made of insulating material and O-rings are located as shown at various parts to provide the necessary seals.

Referring now to Figure 3 the electrode 7 and a workpiece 40 are connected in a circuit comprising a direct current generator 42 and a water cooled copper coil 43. The generator 42 is designed to operate at 300 amperes and has an open circuit voltage of 186 volts.

Inductively coupled with the above circuit 41 is a high frequency spark oscillator 44 the essential components of which are connected as shown and consist of a coil 45, condenser 46, spark gap terminals 47 and the secondary coil 48 of a step-up transformer operated from the mains supply 49.

The oscillator 44 is also connected to the circuit 5 through a condenser 50. Connected across the poles of the generator 42 and in parallel with circuit are two condensers 51 for protecting the generator 42 from the high frequency power.

To set-up the torch shown in Figure 1 for a cutting operation the pipe 25 is connected to an argon cylinder and the pipes 21, 28 are connected to a cooling water supply and the torch is positioned at a convenient distance from the workpiece 40. Argon flow is then initiated so that a surrounding sheath of gas continually flows around the electrode 7 and through the nozzle 32 towards the workpiece 40.

The spark oscillator 44 is then connected with the mains supply 49 and the high frequency oscillations set up by the oscillator are introduced into circuit 41 at a magnified voltage sufficient to break down the resistance of the gap between the tip 8 of the electrode 7 and workpiece 40. In this manner a continuous spark is caused to jump from the electrode tip 8 to workpiece 40 causing ionisation of the argon atmosphere between the parts. Since the electrode tip 8 initially protrudes beyond the end of the nozzle 32 there is no danger of the nozzle 32 becoming electrostatically charged by the spark and entering into the path of the spark. The D.C. generator 42 is then switched into the circuit and a high current density arc immediately strikes to the workpiece 40. When the arc is established the high frequency oscillator 44 is switched out of the circuit 41, although this is an optional step, and a tapping from the argon supply line is made to the pipe 20 causing argon to have access to the piston 10 to raise it against the pressure of the spring 11. This retracts the electrode 7 to a position in which its tip 8 is located within or even slightly above the upper end of the passage 33 in the nozzle 32. Hydrogen is then injected into the argon fed to the torch in sufficient quantity to give the required voltage characteristics of the arc and by reason of the wall stabilising and constricting effect of the nozzle 32 on the arc a very sharp directional and effective cut is produced on the workpiece 40.

The traverse mechanism of the torch is then set in operation to cut the metal along the required contour which may be straight or curved. When the arc moves across the edge of the work it is automatically extinguished. The generator 42 is then switched off, the torch brought to rest and the hydrogen turned off. The argon flow is allowed to continue so that the electrode 7 cools in a protective environment after which it is switched off allowing the electrode 7 to re-assume its normal position for starting.

It will be appreciated that some of the above recited steps may be controlled by relays and after devices and some steps may be effected by a single operation. As an alternative to argon, the piston 10 may be raised by means of compressed air.

We claim:

1. An arc torch comprising a non-consumable electrode, a nozzle having a passage which is coaxial with the electrode and through which the electrode can extend whereby a pilot discharge can be established between the electrode and a metal workpiece without harming the nozzle, means for effecting relative movement between the electrode and nozzle whereby the electrode can be so positioned in relation to the nozzle that a main arc struck between the electrode and workpiece passes through said passage, said passage being sufficiently constricted to wall stabilise a portion of the length of said main arc, and means permitting a gaseous stream to be directed through said passage towards the workpiece and so as to shield the electrode during use.

2. An arc torch according to claim 1, in which the nozzle is stationary and the electrode is movable with respect thereto.

3. An arc torch according to claim 2, in which the electrode is slidable axially with respect to the nozzle.

4. An arc torch according to claim 3, in which the electrode is biased so that its tip normally protrudes beyond the forward end of said passage, the means for moving the electrode being operable to retract the electrode to its working position.

5. An arc torch according to claim 4, in which the means for retracting the electrode is pneumatically operated.

6. An arc torch according to claim 5, in which the pneumatic means is operated by a tapping from the shielding gas supply.

7. An arc torch according to claim 1 wherein a stop member is provided for locating the electrode in working position, and further wherein means are provided externally of the torch for adjusting the position of said stop member.

8. An arc torch according to claim 1 in which the electrode tip is provided with a flat.

9. An arc torch comprising an electrode, a nozzle having a passage which is coaxial with the electrode and through which the electrode can extend whereby a pilot discharge can be established between the electrode and a metal workpiece without harming the nozzle, means for effecting relative movement between the electrode and nozzle whereby the electrode can be so positioned in relation to the nozzle that a main arc struck between the electrode and workpiece passes though said passage, said passage being sufficiently constricted to wall stabilise a portion of the length of said main arc, and means permitting a gaseous stream to be directed through said passage towards the workpiece and so as to shield the electrode during use.

10. The combination of an arc torch according to claim 9 with an electric circuit comprising means for establishing a pilot discharge between the electrode and a workpiece and means for applying a high current density arc between the electrode and workpiece, the nozzle of the torch being insulated from said circuit.

11. The combination according to claim 9, in which the means for establishing the pilot discharge is a high frequency spark oscillator.

12. A process of treating a metal workpiece with a high current density arc which passes from an electrode to the workpiece by way of a passage coaxial with the electrode and provided in a nozzle said passage being sufficiently constricted to wall stabilise the arc, which process comprises positioning the electrode whereby an arc can be established between the electrode and workpiece without harming the nozzle, establishing said arc and thereafter positioning the electrode in relation to the nozzle whereby the arc is wall stabilised, said process being conducted in the presence of a protective gas for the electrode and workpiece which is caused to follow the path of the arc.

13. A process of treating a metal workpiece with a high current density arc which passes from an electrode to the workpiece by way of a passage coaxial with the electrode and provided in a nozzle said passage being sufficiently constricted to wall stabilise the arc, which process comprises positioning the electrode whereby a pilot discharge can be established between the electrode and workpiece without harming the nozzle, establishing said discharge and then establishing the arc and thereafter positioning the electrode in relation to the nozzle whereby the arc is wall stabilised, said process being conducted in the presence of a protective gas for the electrode and workpiece which is caused to follow the path of the arc.

14. Process according to claim 12, in which the positioning of the electrode for wall stabilising the arc is effected by movement of the electrode relatively to a fixed nozzle.

15. A welding process according to claim 12 in which the constriction of the passage is sufficient to produce an arc of the requisite power.

16. A process of cutting a metal workpiece according to claim 12 in which the constriction of the passage is sufficient to produce an arc of the requisite power.

17. A process of cutting aluminium, aluminium-base alloys, copper or copper-base alloys, magnesium or magnesium-base alloys, or stainless steel according to claim 16.

References Cited in the file of this patent
UNITED STATES PATENTS

| | | |
|---|---|---|
| 1,523,667 | Steele et al. | Jan. 20, 1925 |
| 2,360,160 | Pickhaver | Oct. 10, 1944 |
| 2,475,357 | Miller | July 5, 1949 |
| 2,479,092 | Ainsworth | Aug. 16, 1949 |
| 2,510,415 | Pitcher | June 6, 1950 |
| 2,806,124 | Gage | Sept. 10, 1957 |